(12) United States Patent  
Kanie et al.

(10) Patent No.: US 7,409,496 B2  
(45) Date of Patent: Aug. 5, 2008

(54) STORAGE MANAGEMENT SYSTEM, STORAGE MANAGEMENT SERVER, AND METHOD AND PROGRAM FOR CONTROLLING DATA REALLOCATION

(75) Inventors: Yukie Kanie, Yokohama (JP); Toru Takahashi, Kamakura (JP); Tomoyuki Kaji, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 11/155,749

(22) Filed: Jun. 20, 2005

(65) Prior Publication Data

US 2006/0242377 A1  Oct. 26, 2006

(30) Foreign Application Priority Data

Apr. 26, 2005  (JP)  ............................. 2005-127882

(51) Int. Cl.  
*G06F 13/10* (2006.01)
(52) U.S. Cl. .................................... 711/114
(58) Field of Classification Search ................ 711/112, 711/114, 165, 164  
See application file for complete search history.

(56) References Cited

U.S. PATENT DOCUMENTS

2004/0024796 A1  2/2004  Takeda et al.  
2004/0225662 A1  11/2004  Nojima

FOREIGN PATENT DOCUMENTS

JP  2001-067187  3/2001  
JP  2003-140836  5/2003

*Primary Examiner*—Kevin L Ellis  
(74) *Attorney, Agent, or Firm*—Antonelli, Terry, Stout & Kraus, LLP.

(57) ABSTRACT

In a storage management system, a host recognizes a plurality of storage apparatuses as one virtual storage apparatus. The user divides each of the volumes that the storage apparatuses have into a plurality of classes in accordance with a policy. When a user specifies moving target data and a class or a policy of a moving destination, the data is reallocated to a class that meets it. The class or policy is held as a data allocation policy. If a sufficient empty space is not present in the moving destination class, by finding out from allocated data, data that also complies with a policy of other class, target data to be expelled and a class of expelling destination are determined for expelling data, so as to ensure a sufficient empty space for reallocation.

10 Claims, 18 Drawing Sheets

FIG.8

Volume Property Management Table T2

| Logical ID | Physical ID | | RAID Level | Emulation Type | Disc Type | Memory Capacity (GB) | Usage State | Apparatus Type |
|---|---|---|---|---|---|---|---|---|
| | Apparatus # | Vol. # | | | | | | |
| 001 | 1 | 01 | RAID 1 | EMU1 | FC | 100 | In Use | SS1 |
| 002 | 1 | 02 | RAID 1 | EMU1 | FC | 100 | Empty | SS1 |
| 003 | 1 | 03 | RAID 5 | EMU1 | FC | 100 | In Use | SS1 |
| 004 | 1 | 04 | RAID 0 | EMU1 | FC | 100 | In Use | SS1 |
| 005 | 2 | 01 | RAID 5 | EMU2 | FC | 40 | Empty | SS2 |
| 006 | 2 | 02 | RAID 5 | EMU2 | SATA | 100 | Empty | SS2 |
| 007 | 2 | 03 | RAID 1 | EMU2 | FC | 200 | In Use | SS2 |
| 008 | 3 | 01 | RAID 5 | EMU2 | FC | 100 | Empty | SS3 |
| ... | | | ... | ... | ... | ... | ... | ... |

T4

| Corresponding Host Management Table | | |
|---|---|---|
| Logical ID | Host | Application Program |
| 001 | mail-1.mycomp.com | App1 |
| 007 | mail-2.mycomp.com | App1 |
| 010 | mail-4.mycomp.com | App2 |
| 012 | mail-3.mycomp.com | App1 |
| 018 | www.mycomp.com | App3 |
| 019 | www.mycomp.com | App3 |
| 031 | mail-5.mycomp.com | App2 |
| 041 | db.mycomp.com | App4 |
| 043 | db.mycomp.com | App4 |
| 049 | db.mycomp.com | App4 |
| ... | ... | ... |

FIG.11

| | | | | Allocated Data Management Table | | | | |
|---|---|---|---|---|---|---|---|---|
| Data No. | Data Name | Construction Volume ID | Current Class | Data Capacity | Data Allocation Policy | | | |
| | | | | | Performance | Capacity | Reliability | Conditional Expression |
| #1 | File System | 018,019,070,··· | Low-Cost | 1000 | Medium | =1000 | Medium | Disc Type = SATA and RAID level = RAID 5 |
| #2 | Customer Management DB | 041,043 | High-Reliability | 400 | Medium | =400 | High | RAID level = RAID 1 and Disc Type = FC |
| #3 | Requisition Management DB | 049 | High-Reliability | 800 | High | ≧800 | High | Apparatus Type = SS1 and RAID level = RAID 5 |
| #4 | Mail Data 1 | 001,007,012 | High-Reliability | 800 | Medium | ≧500 | Medium | ··· |
| #5 | Mail Data 2 | 010,031,033,··· | Low-Cost | 20000 | Low | =20000 | Low | ··· |
| #6 | ··· | | | | | | | ··· |

51 Web Browser

T7 Volume Correspondence Table

Selection Results for Moving Destination Volumes

| Source/Target | Logical ID | RAID Group No. | RAID Level | Emulation Type | Memory Capacity | Expelling of Data |
|---|---|---|---|---|---|---|
| Source | 7:23 | 2-1 | RAID5 | EMU2 | 6.87GB | |
| Target | 1:23 | 3-1 | RAID5 | EMU2 | 6.87GB | * |
| Source | 7:24 | 2-1 | RAID5 | EMU2 | 6.87GB | |
| Target | 1:23 | 2-3 | RAID5 | EMU2 | 6.87GB | * |
| Source | 7:23 | 2-1 | RAID5 | EMU2 | 6.87GB | |
| Target | 1:23 | 3-4 | RAID5 | EMU2 | 6.87GB | * |

Expelling Destinations for Expelling Targets

| Source/Target | Logical ID | RAID Group No. | RAID Level | Emulation Type | Memory Capacity | Class |
|---|---|---|---|---|---|---|
| Source | 1:23 | 3-1 | RAID5 | EMU2 | 6.87GB | Class3 |
| Target | 1:20 | 1-1 | RAID5 | EMU2 | 6.87GB | Class2 |
| Source | 1:23 | 2-3 | RAID5 | EMU2 | 6.87GB | Class3 |
| Target | 1:21 | 1-1 | RAID5 | EMU2 | 6.87GB | Class2 |
| Source | 1:23 | 3-4 | RAID5 | EMU2 | 6.87GB | Class3 |
| Target | 1:22 | 1-1 | RAID5 | EMU2 | 6.87GB | Class2 |

FIG.17A

Moving Destination Policy Input Screen — 6320

| Capacity | 400GB | Or More ▼ | AND ▼ |
| Emulation Type | Open-V ▼ | | AND ▼ |
| RAID Level | RAID5 ▼ | | AND ▼ |
| Disk Type | FC ▼ | | AND ▼ |

Input is Complete

FIG.17B

Moving Destination Policy Input Screen — 6322

| Capacity | 400GB | Or More ▼ | AND ▼ |
| OS Type | Windows ▼ | | AND ▼ |
| Reliability | High ▼ | | AND ▼ |
| Performance | Medium ▼ | | AND ▼ |

Input is Complete

FIG.18A

Policy Conversion Table [OS type] — T61

| Classification | Emulation Type |
|---|---|
| Windows | EMU1 |
| Solaris | EMU1 |
| VOS3 | EMU2 |
| ... | ... |

FIG.18B

Policy Conversion Table [Reliability] — T62

| Classification | Disc Type | RAID Level |
|---|---|---|
| High | FC | RAID1 |
| Medium | FC | RAID5 |
|  | SATA | RAID1 |
| Low | SATA | RAID5 |

FIG.18C

Policy Conversion Table [Performance] — T63

| Classification | Apparatus Type |
|---|---|
| High | SS1 |
|  | SS2 |
| Medium | SS3 |
|  | SS4 |
|  | SS5 |
|  | SS6 |
| Low | SS7 |
|  | SS8 |

STORAGE MANAGEMENT SYSTEM, STORAGE MANAGEMENT SERVER, AND METHOD AND PROGRAM FOR CONTROLLING DATA REALLOCATION

CLAIM OF PRIORITY

The present application claims priority from Japanese application JP 2005-127882 filed on Apr. 26, 2005, the content of which is hereby incorporated by reference into this application.

BACKGROUND OF THE INVENTION

1. Field of the Invention

The present invention relates to a storage management system, and in particular to a technology for controlling data reallocation between or among memory areas which are controlled by the storage management system.

2. Description of the Related Art

A storage management system comprises and constructed by at least one storage apparatus which is referred to as, for example, a disc array sub-system. This storage apparatus has drives such as hard disc drives and semiconductor memory drives located and constructed in an array form, and provides a memory area which is based on RAID (Redundant Array of Independent Disks). A host computer (hereinafter referred to as "host") accesses to a logical memory area provided by the storage apparatus to read/write data.

The amount of data managed in organizations such as corporations, local governments, educational institutions, financial institutions, government and other public offices, by the way, is continuing to expand year by year, and the amount of data increases, storage apparatuses are added and replaced. In order to handle such increased amount of data and complicated system configuration, it is proposed to improve utility efficiency of storage apparatuses by reallocating data handled by an application program such as a mail management software and a database management software, to an appropriate position in accordance with how frequently the data is accessed, and the like. See Japanese Patent Application Laid-Open (Kokai) No. 2001-67187 (FIGS. 4-6).

Also in Japanese Patent Application Laid-Open (Kokai) No 2003-140836 (FIGS. 3-4), a method is proposed in which after all disc apparatuses in the system are classified from performance point of view and the order of performance among classes is defied in advance, data in a memory area of a high rate of use by the disc apparatus is reallocated to a class of a higher-performance. In the document, a data reallocation control technology is disclosed in which a sufficient unused area for reallocation is ensured by reallocating data from the high-performance class to a low-performance class before performing the reallocation to the high-performance class, in case no unused area was found in the high-performance class selected as a reallocation destination.

In each of the above-mentioned patent documents, a technology is disclosed in which data stored in one volume is copied to another volume based on information on performance and usage of disc to reallocate the data.

However, the technology as described in JP 2001-67187 is not convenient for use because it requires reallocating data individually by each volume unit, and does not allow a volume to be moved between or among classes which are freely defined by the user. In the technology as described in JP 2003-140836, when a sufficient empty area is not left in the class selected as a reallocation destination, an empty area is obtained by unconditionally reallocating an area of low rate of usage by the disc apparatus, out of the areas classified as the class, to a class of lower performance (in the following description, not only reallocation to a lower-performance class but also reallocation for obtaining a sufficient empty area for reallocation will be referred to as "expelling data"). Since the user of data has been unable to specify the way in which an expelling target and an expelling destination class are selected, there is a possibility that a class selected as an expelling destination for the data selected as the expelling target does not correspond to the data reallocation destination which the user of the data originally assumed.

SUMMARY OF THE INVENTION

Accordingly, an objective of the present invention is to provide means for selecting an expelling target and the expelling destination class, taking into consideration requests from the user of reallocated data, when no sufficient empty area is present in the class selected as the data reallocation destination and allocated data in the class is to be expelled to another class. Another objective of the invention is to provide means for reallocating data distributed in a plurality of storage apparatuses with an easier operation.

The present invention which solves the objectives is a storage management system comprising at least:

a plurality of storage apparatuses each comprising one or more volumes for storing data;

a volume virtualization apparatus for virtually and unitarily managing volumes which the plurality of storage apparatuses comprise; and a storage management server for managing data reallocation between or among volumes in one of the storage apparatuses, or between or among volumes in the plurality of storage apparatuses, which are connected in the system, wherein the storage management server comprises:

a storing portion for including and storing volume property information for managing a volume property indicating a property of each of the volumes, a classification policy which is a condition for classifying the volume in regard to the volume property, and a data allocation policy for managing a request from a user relevant to data allocation; and a control portion for classifying the volumes based on the volume property information and the classification policy in advance, reallocating data in a moving source volume specified by the user to a volume meeting a class specified by the user or a class meeting the data allocation policy, and expelling data present in a reallocation destination as needed. The system may have a construction without the volume virtualization apparatus. The invention also includes a storage management server, a method for controlling data reallocation, and a program for controlling data reallocation.

According to the invention, data reallocation is possible which is not affected by a lack of an empty area in a class specified as the data reallocation destination. It is further made possible to reallocate data distributed in a plurality of storage apparatuses with easier operation. Additionally, it is allowed to prevent reallocation of data not meeting a request by a user of data. Furthermore, under some conditions, it is possible to optimize reallocation for data other than that which was originally a reallocation target, because by the data reallocation, data allocated in a class specified as a reallocation destination is revised in terms of its allocation destination.

BRIEF DESCRIPTION OF THE DRAWINGS

FIG. 8 is a drawing showing a construction of a volume property management table.

FIG. 11 is drawing showing a construction of an allocated data management table.

FIG. 16 is a drawing showing an exemplary display on which a proposal for data reallocation is presented.

FIG. 17 is a drawing showing an exemplary display on which a policy related to the moving destination is specified, wherein (a) is a type that specifies an individual volume property, and (b) is a type that specifies a request from an end-user's point of view.

FIG. 18 is a drawing showing an exemplary construction of a policy conversion table, wherein (a) relates to OS types, (b) to reliability, and (c) to performance.

DESCRIPTION OF THE PREFERRED EMBODIMENT

Figure 1:
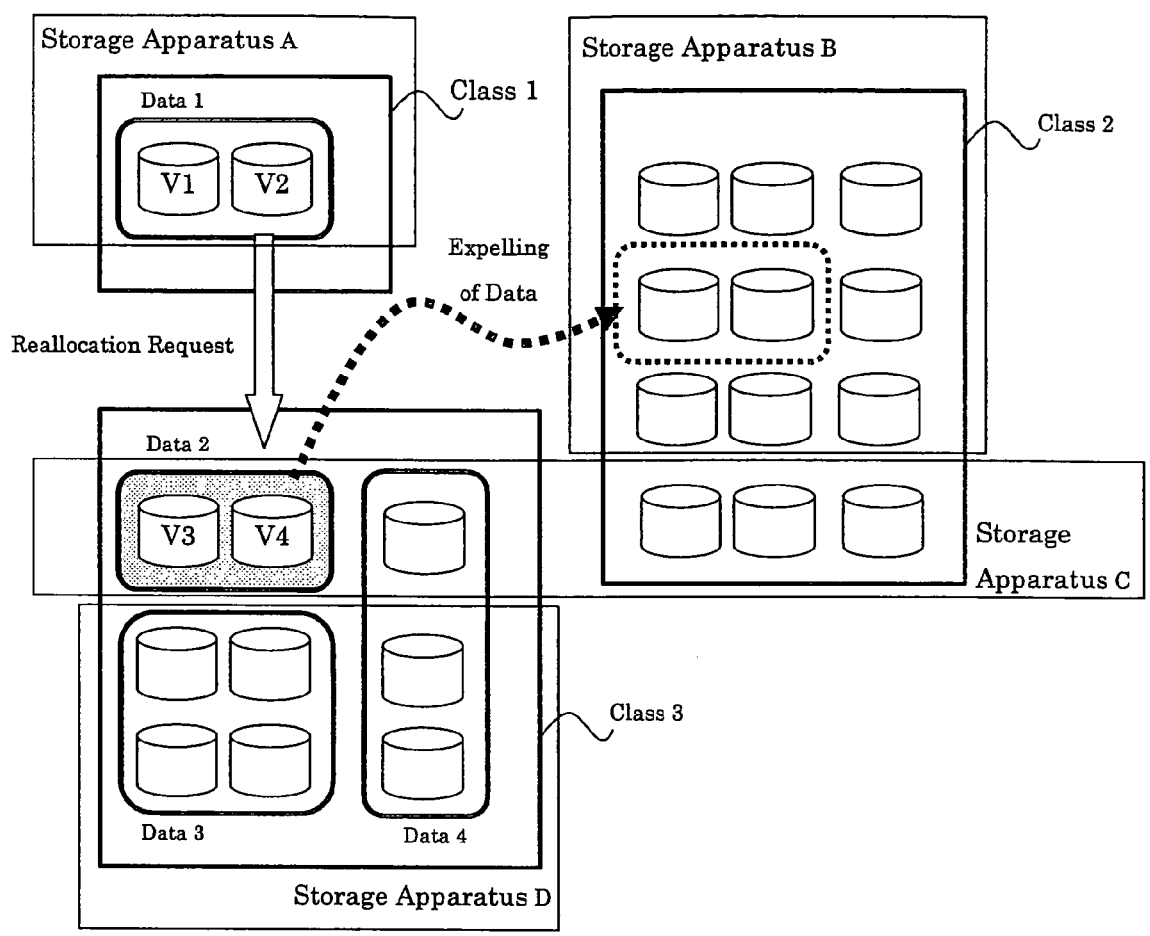
FIG. 1 is a drawing showing a general concept of an embodiment of the invention.

Now referring to the drawings, the best mode for implementing the invention will be described below in detail.

System Concept

FIG. 1 is a drawing showing a general concept of an embodiment of the invention. A storage management system according to the embodiment comprises a plurality of storage apparatuses, as will be discussed hereinafter. The storage apparatuses have volumes which are virtually and unitarily managed. A host (see FIG. 2) sees the plurality of storage apparatuses as one virtual storage apparatus as a whole.

Each storage apparatus comprises one or more volumes. Each of these volumes is, for example, a logical memory area to be set on a physical memory area provided by a physical memory drive such as a hard disc drive, a semiconductor memory drive, and optical disc drive.

Here, the storage apparatuses may comprise a same kind of drive or different kinds of drives. Therefore, volumes positioned in a same storage apparatus may have different volume properties such as performance and price.

Users can arbitrarily group volumes possessed by the storage management system into a plurality of classes 1-3, for example. Class 1 can be defined as, e.g., a high-reliability class. The high reliability class consists of, for example, a group of volumes configuring high reliability drives such as a fiber channel disc (FC disc) as RAID 1. Another class 2 can be defied as a low-cost class, for example. The low-cost class consists of, for example, a group of volumes configuring a low-cost drive such as SATA (Serial AT Attachment) as RAID 5. Another class 3 can be defined as, for example, an archive class. The archive class consists of, for example, a group of volumes to be set on a low-cost disc drive having a capacity of less than a predetermined capacity.

As shown in FIG. 1, classes 1-3 are virtually configured across the storage apparatuses. Users can freely define, based on a use standard (policy), a plurality of volumes that configure the storage management system as a desirable class such as a high reliability class, a low cost class, a fast responsiveness class, and an archive class. Since a policy can be set independently from the configuration of the storage management system, it can occur that one part of the volumes belongs to a plurality of classes, or other part of the volumes does not belong to any class, depending on the condition configuring each class.

A plurality of data can be allocated to each class 1-3, and each data can be stored into one or more mutually related group of volumes in a divided manner. For example, data 1 in FIG. 1 indicates data stored in two volumes V1, V2 belonging to class 1. These volumes V1, V2 are mutually related volumes such as a group of volumes for storing data used by a same application program and a group of volumes for storing data configuring a same file system.

Some data change in its value as the passage of time. High-value data is placed in a high reliability class and frequently used by an application program. Data with a reduced value as the passage of time is preferably moved to another class, because the memory resource in the high reliability class is particularly limited.

Then the user considers reallocating the data stored in the plurality of interrelated volumes V1, V2, and decides to move them from class 1 to class 3 (here, an archive class). The user specifies in a lump the reallocation of the volumes V1, V2, which are moving sources, to give a direction to move the volumes to the Class 3.

With this, in the class 3 which is the moving destination, volumes are selected which can respectively store the data of the volumes V1, V2 configuring the reallocation target data to which selected volume data is copied. After the copying is completed, data in the moving source volumes V1, V2 can be deleted, and can be reused as an empty volume if deleted.

Here, when reallocating the respective data in the volumes V1, V2, volumes to which the data can be copied are selected in the class of the moving destination. Each volume has property information. Volume properties include, for example, identification information for identifying each volume, RAID level, disc type, memory capacity, usage state for indicating whether or not the volume is in use, and type of storage apparatus to which the volume belongs.

Data copying between volumes does not require all volume properties to match between the moving source volumes V1, V2 and the volume of the moving destination candidate, but it suffices only if some properties match. Properties that need to match (hereinafter referred to as "required properties") include memory capacity and emulation type. That is, data copying can not be performed between a moving source volume and a moving destination volume unless at lease their memory capacities and emulation types match. With regard to memory capacity, a volume having a memory capacity same as or greater than that of the moving source volume can be selected as a moving destination volume.

When more than a required number of volumes having required properties are detected, a volume comprising properties closer to the moving source volume can be selected as a moving destination volume, taking into consideration the matching degree of properties other than the required properties. Though broadly divided into two kinds: required and the other properties, for example, the volume properties are not limited thereto but may be categorized into three or more kinds of properties such as required, semi-required, and other properties. These properties may then be weighted to match the volumes.

In case no volume matching in the required properties was detected, candidate data to be expelled and its expelling destination class are determined out of those data reallocated in Class 3 as the moving destination. By expelling data based on the determination, a sufficient empty area for reallocation can be obtained. An effect may also occur where the data to be expelled is reallocated to a more appropriate class. A thinkable case in which this may occur include, for example, when modifying or expanding volume configuration to newly set a more suitable class after the data was stored in the volume.

Depending on the condition constructing each class as mentioned above, a part of the volumes may belong to a plurality of classes. In other words, there may be a part that overlaps with conditions of a plurality of classes. For example, to suppose that there is a volume X that meets any condition of classes 1 and 2. It is no double possible to move data Y in the volume X to a volume in class 3. Further, if a volume which is more appropriate for the allocation of the data Y is present in a portion of class 2 not including class 1, or a portion of class 1 not including class 2, then the data Y may be moved to the volume.

System Configuration and Overview

Figure 2:
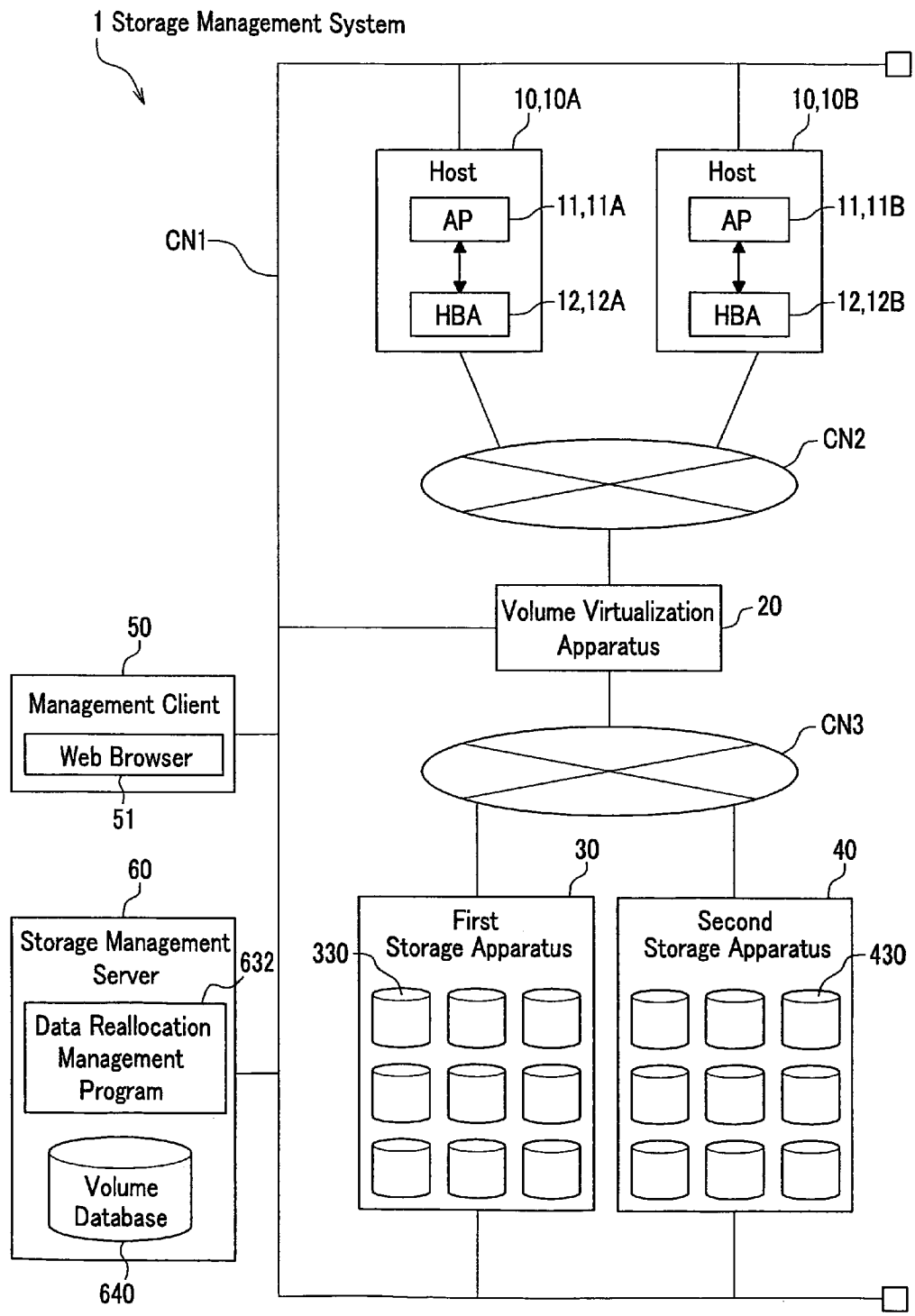
FIG. 2 is a block diagram showing a general configuration of a storage management system.

FIG. 2 is a block diagram showing a general configuration of a storage management system. As will be respectively described below, this storage management system 1 includes, for example, a plurality of hosts 10A, 10B (hereinafter referred to as "host 10" unless otherwise distinguished), a volume virtualization apparatus 20, a plurality of storage apparatuses (a first storage apparatus 30, a second storage apparatus 40), a management client 50, and a storage management server 60, which are interconnected via a communication network CN1 such as a LAN (Local Area Network).

Each of the hosts 10A, 10B can be achieved by a computer system such as a server, a personal computer, a work station, a mainframe, a portable information terminal. Further, a plurality of open-system hosts and a plurality of mainframe-system hosts, for example, can be mixedly present in a same storage management system 1.

Each of the hosts 10A, 10B includes, for example, application programs 11A, 11B (abbreviated as "AP" in FIG. 2 and will be referred to as "application program 11" unless otherwise distinguished), and HBAs (Host Bus Adapters) 12A, 12B (referred to as "HBA12" unless otherwise distinguished). More than one application program 11 and HBA 12 can be respectively provided for each host 10.

The application programs 11A, 11B include, for example, an email management program, a database management program, and a file system. The application programs 11A, 11B can be connected via a plurality of client terminals (not shown) and another communication network, and can provide an information processing service in response to a request from each client terminal.

HBAs 12 send/receive data to/from the storage apparatuses, and are connected to a volume virtualization apparatus 20 via a communication network CN2. The communication network CN2 may includes, for example, LAN, SAN (Storage Area Network), the internet, and a dedicated line. In the open-system host, data is transferred based on a protocol such as TCP/IP (Transmission Control Protocol/Internet Protocol), FCP (Fiber Channel Protocol), iSCSI (internet Small Computer System Interface). In the mainframe-system host, data is transferred according to a communication protocol such as FICON™ (Fiber Connection), ESCON™ (Enterprise System Connection), ACONARC™ (Advanced Connection Architecture), and FIBARC™ (Fiber Connection Architecture).

In addition to this, to each of the hosts 10A, 10B may be mounted a management program (not shown) such as a path control program. Such a management program performs processes such as scattering loads to a plurality of HBAs 12 and switching paths when a failure occurs.

Figure 3:
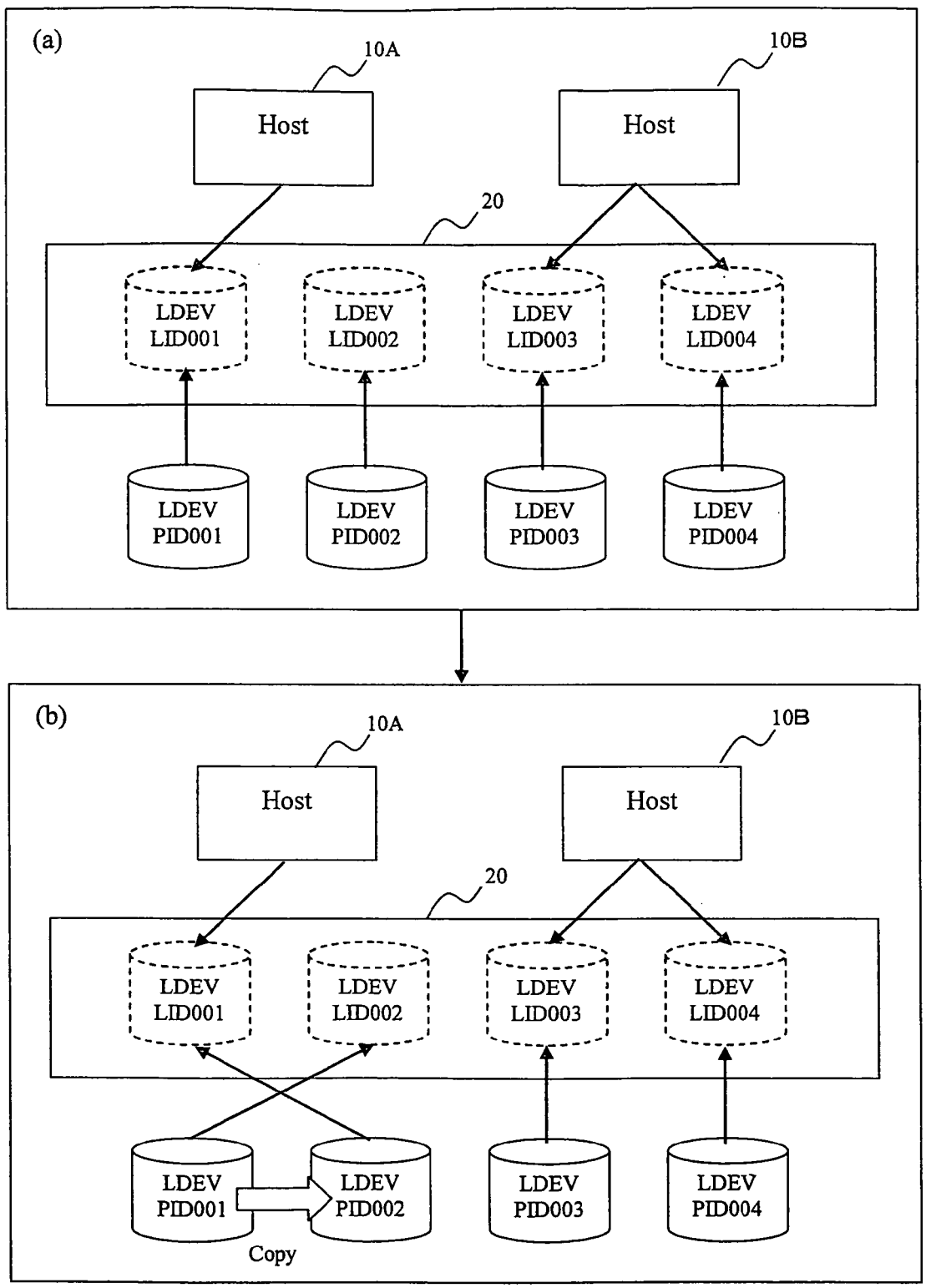
FIG. 3 is a drawing showing a manner in which volumes distributed in a storage management system are virtualized for management.

The volume virtualization apparatus 20 (hereinafter also referred to a "virtualization apparatus") provides a false appearance of logical volumes 330, 430 present in the storage apparatuses as one virtual storage apparatus. For example, as shown in FIG. 3(*a*), the virtualization apparatus 20 provides each of the hosts 10 (10A, 10B) with a plurality of logical volumes (LDEV: Logical Device) indicated by identification information LID001-LID004. Each of these logical volumes respectively corresponds to another logical volume indicated by the identification information PID001-PID004. A logical volume having identification information PID is the real volume in which data is actually stored, and the logical volume that the host 10 can directly recognize is the virtual volume.

By controlling the mapping between a virtual volume and a real volume, data operation can be performed between or among real volumes without the user being aware of it. For example, as shown in FIG. 3(*a*), when the data stored in the real volume (PID001) is moved to another real volume (PID002) for example to improve data allocation, the data is copied between these real volumes before the mapping is respecified between the real volume and the virtual volume. This makes the host 10 unaware of the moving of data between the real volumes. Also, by exchanging information (on correspondence with the real volume) between the virtual volumes LID001 and LID002, the host 10 can be given an appearance as if the data has been exchanged between virtual volumes.

In this manner, the virtualization apparatus 20 virtualizes, unitarily manages, and provide the host 10 with a variety of real volumes present on the storage apparatuses. The virtualization apparatus 20 may be provided in the storage apparatus, as will be described below. Further, the virtualization apparatus 20 and the storage management server 60 may be provided on a same computer. With the provision of the virtualization apparatus 20, inter-volume data movement can be conducted not only in a storage apparatus but also across a plurality of storage apparatuses. A configuration may also be provided such that the real volume is shown to the host 10 as is, without providing the virtual apparatus 20. In this case, data movement is limited to between or among volumes in a storage apparatus.

Returning to FIG. 2, the first storage apparatus 30 and the second storage apparatus 40 comprise logical volumes (real volumes) 330, 430 respectively, and are each connected to the virtualization apparatus 20 via a communication network CN3 such as a SAN. The first storage apparatus 30 and the second storage apparatus 40 read/write data to/from a volume in response to a request from the host 10. An exemplary construction of the storage apparatus will be further described below.

The management client 50 is constructed as a computer system such as a personal computer, workstation, and portable information terminal, and comprises a Web browser 51. The user can operate the Web browser 51 to login to the storage management server 60, so as to, for example, give directions to the storage apparatus or obtain a variety of information in the storage apparatus.

The storage management server 60 is a computer system for managing inter-volume data reallocation, for instance. An exemplary construction of the storage management server 60, which will be further described in detail below, comprises a data reallocation management program 632 and a volume database 640, for example.

Figure 4:
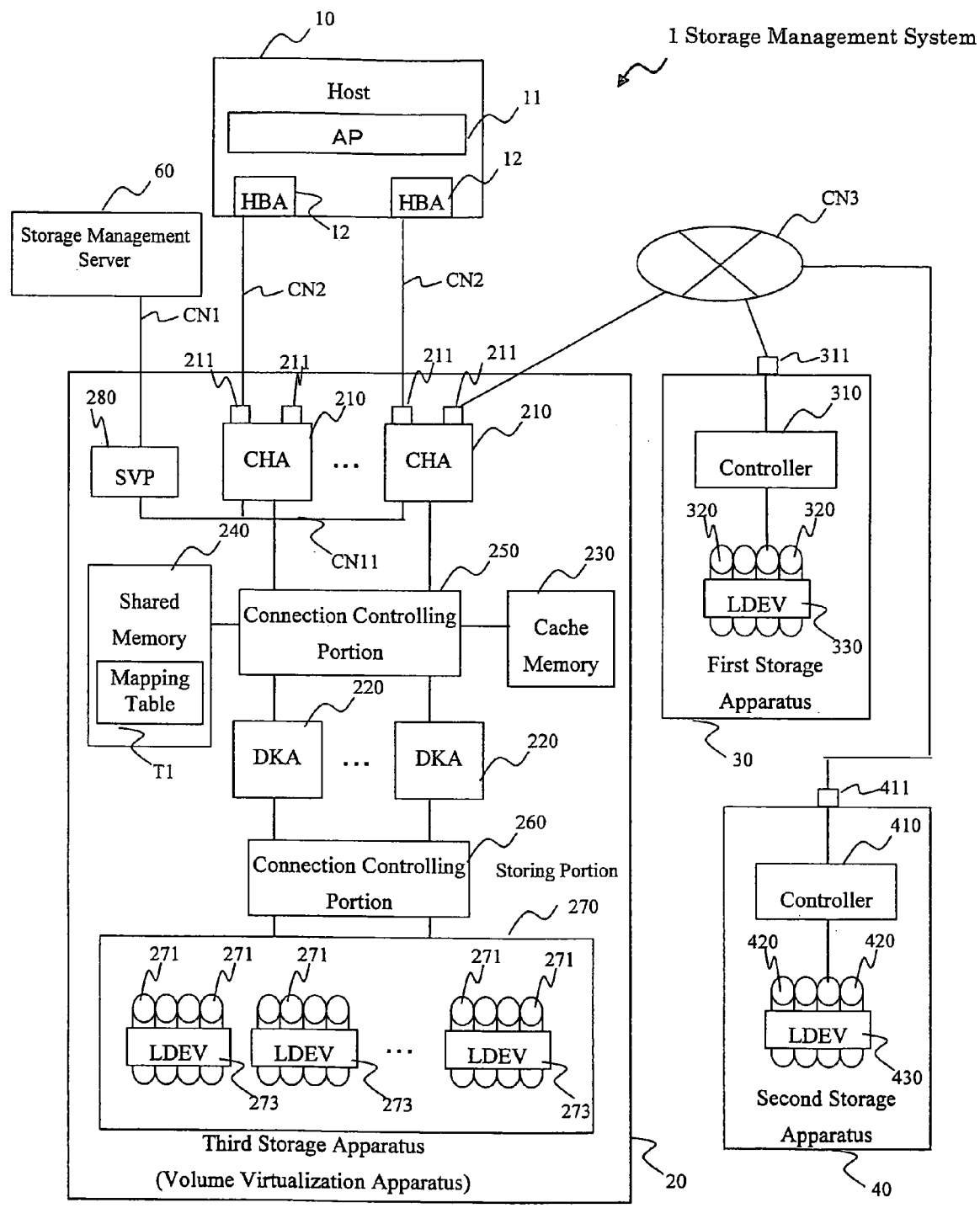
FIG. 4 is a block diagram showing a hardware configuration of the storage management system.

FIG. 4 is a block diagram schematically showing a hardware configuration of the storage management system, in which is shown a virtualization apparatus 20 configured as a storage apparatus.

Hereinafter in this embodiment, the virtualization apparatus 20 will be also referred to as a third storage apparatus 20. The apparatus 20 includes, as will be respectively described below, a plurality of channel adapters 210 (hereinafter referred to as "CHA"), a plurality of disc adapters 220 (hereinafter referred to as "DKA"), a cache memory 230, a shared memory 240, a connection control portions 250, 260, a storing portion 270, and a SVP (Service Processor) 280, for example.

The CHA 210 controls receiving/sending data among the host 10, an external first storage apparatus 30 and a second storage apparatus 40, and is constructed as a computer system comprising, for example, a CPU (Central Processing Unit), a memory, and an input/output circuit. The CHA 210 can each comprise a plurality of communication ports 211 and send/receive data individually to/from each communication port 211. Each CHA 210 corresponds to one kind of communication protocol and is provided depending on the kind of the host 10. Each CHA 210 may also correspond to a plurality of communication protocols.

The DKA 220 controls sending/receiving data with respect to the storing portion 270. Like the CHA 210, the DKA 220 is configured as, for example, a micro computer system comprising a CPU and a memory. Each DKA 220 accesses to each disc drive 271 to read or write data, by for example converting a logical block address (LBA) specified by the host 10 to an address on a physical disc. Function of the CHA 210 and that of the DKA 220 may be integrated in one or more controller.

The cache memory 230 is for memorizing write-date written from the host 10 or read-data read out to the host 10. The cache memory 230 consists, for example, of a volatile or nonvolatile memory. When the cache memory 230 includes a nonvolatile memory, it is preferable to backup the memory using a battery power source (not shown) for example. The cache memory 230 is constructed from two areas: a read cache area and a write cache area, and data stored in the write cache area can be memorized in a multiplexed manner, i.e., it is not necessary to multiplex read-data which has its same data also present in the disc drive 271, because even if the read-data is lost, it suffices to re-read it from the disc drive 271. On the contrary, the write-data, which exists only in the cache memory 230 in the storage apparatus 20, is preferably multiplexed and memorized for reliability. Whether or not the cache data should be multiplexed before it is memorized depends on the specification of the storage apparatus and user specification.

The shared memory 240 (also referred to as a control memory) is constructed for example by a nonvolatile memory, but may be constructed by a volatile memory. In the shared memory 240, control information or management information such as a mapping table T1 is memorized. Information such as these control information can be multiple controlled by a plurality of memories. An exemplary configuration of the mapping table T1 will be described below.

Here, the cache memory 230 and the shared memory 240 may each be constructed as a separate memory package, or may be provided in a same memory package. Also, one part of a memory may be used as a cache area, and the other part as a control area, i.e., a cache memory and a shared memory may be constructed as a same memory.

The connection control portion (switch portion) 250 provides a mutual connection among each CHA 210, each DKA 220, the cache memory 230, and the shared memory 240. This allows all CHAs 210 and DKAs 220 to individually access to each of the cache memory 230 and the shared memory 240. The connection control portion 250 is constructed by a crossbar switch, for example. The connection control portion 260 is for connecting each DKA 220 and the storing portion 270. The connection control portion 260 is constructed, for example, by a fiber-channel.

The storing portion 270 comprises many disc drives 271. The storing portion 270 may be provided in a same housing together with controller portions such as CHAs 210 and DKAs 220, or may be provided in a housing different from the controller portions.

The storing portion 270 may be provided with a plurality of disc drives 271. As the disc drives 271, a FC disc (fiber-channel disc) and a SATA (Serial AT Attachment), can be used, for instance. The storing portion 270 need not be configured by a same type of disc drives, but more than one types of disc drives may be mixedly present.

Here, in general, performance will lower in the order of the FC disc and the SATA disc. The different types of disc drives can be used depending on the manner in which data is used, such as storing data with high frequency of access (high-value data) into a high-performance FC disc, and data with low frequency of access (low-value data) into a low-performance SATA disc. On a physical memory area provided by each disc drive 271, a plurality of layered logical memory areas can be provided. The construction of the memory areas will be further described below.

The SVP 280 is connected to each of the CHAs 210 and DKAs 220, via the internal network CN11 such as a LAN. In FIG. 4, the SVP 280 is only connected to the CHAs 210, but may also be connected to the DKAs 220. The SVP 280 collects a variety of states in the storage apparatus 20 and provides them to the storage management server 60 as they are or in a processed form.

The third storage apparatus 20 that achieves volume virtualization is a window through which a data input/output request from the host 10 is processed, and is connected to the first storage apparatus 30 and the second storage apparatus 40 via the communication network CN3. Though, in FIG. 4, it is shown that two storage apparatuses (the first storage apparatus 30 and the second storage apparatus 40) are connected to the storage apparatus 20, the invention is not limited thereto, and one storage apparatus or three or more storage apparatuses may be connected to the storage apparatus 20.

The first storage apparatus 30 comprises, for example, a controller 310, a communication port 311 used for connection with the third storage apparatus 20, and a disc drive 320. The controller 310 is for achieving functions of aforementioned CHA 210 and DKA 220, and controls sending/receiving of data to/from each of the third storage apparatus 20 and the disc drive 320.

The first storage apparatus 30 may have a configuration same as or different from the third storage apparatus 20. The first storage apparatus 30 can conduct data communication with the third storage apparatus 20 in accordance with a predetermined communication protocol (e.g., FC and iSCSI), and only needs to comprise a memory drive (memory device) such as the disc drive 320. A logical volume that the first storage apparatus 30 has is mapped to a predetermined layer in the third storage apparatus 20, and is used from the host 10 as if the volume is an internal volume of the third storage apparatus 20, as will be described below.

Although in this embodiment, a hard disc drive is illustrated as an example of the physical memory drive, the invention is not limited thereto. Besides the hard disc drive, a semiconductor memory drive, a magnetic tape drive, an optical disc drive, a magneto optical disc drive, and the like can be used as a memory drive.

Like the first storage apparatus 30, the second storage apparatus 40 comprises, for example, a controller 410, a disc drive 420, and a port 411. The second storage apparatus 40 may have a construction same as or different from the first storage apparatus 30.

Figure 5:
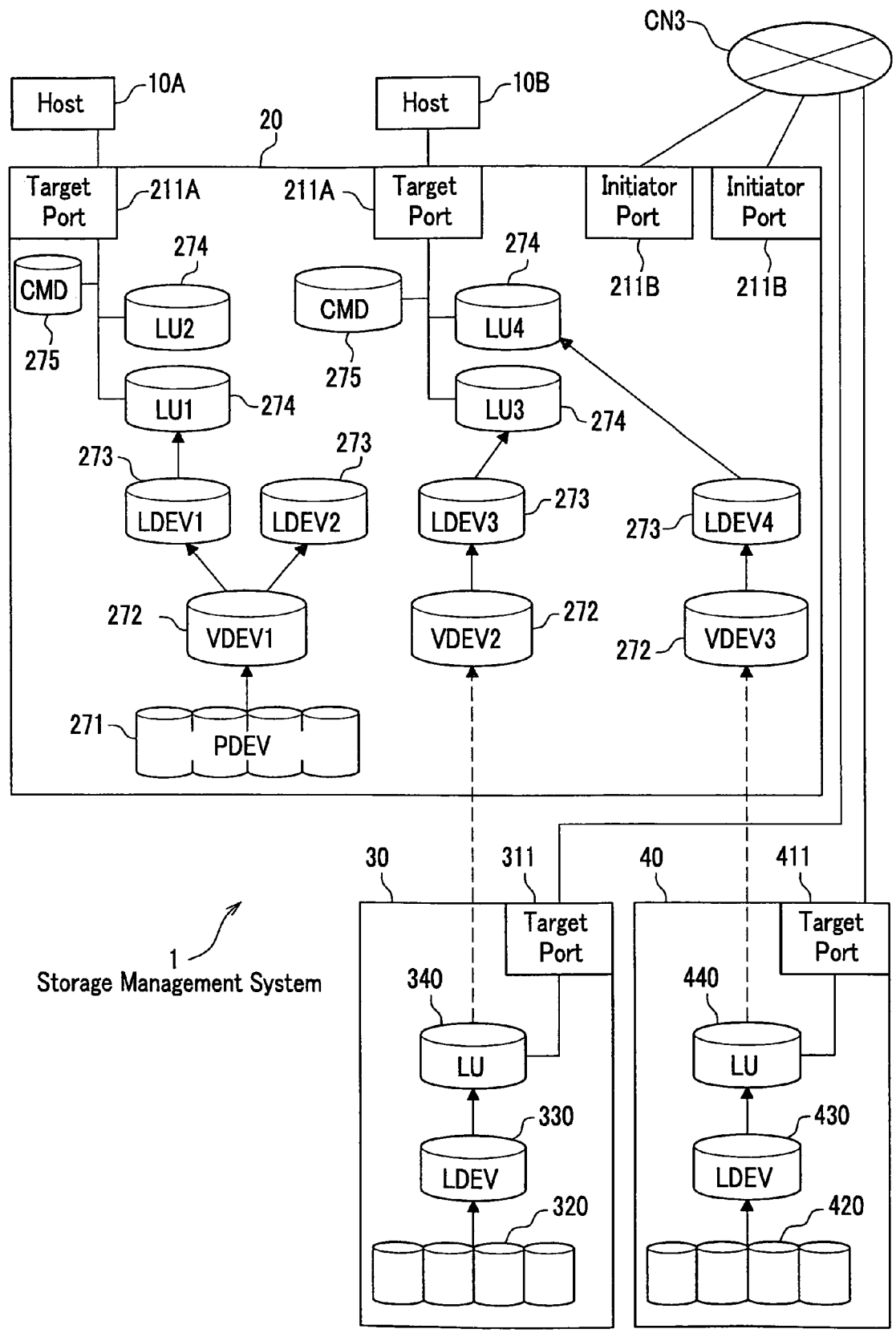
FIG. 5 is a drawing showing a logical memory structure of the storage management system.

FIG. 5 is a drawing showing a logical memory structure of the storage management system. First, the construction of the third storage apparatus 20 will be described. The memory structure of the third storage apparatus 20 can be broadly divided into a physical memory layer and a logical memory layer. The physical memory layer is constructed by a PDEV (Physical Device) 271 which is a physical disc. The PDEV corresponds to a disc drive. The logical memory layer is constructed by a plurality of (e.g., two) layers. One logical layer is constructed by a VDEV (Virtual Device) 272. Other logical layer is constructed by a LDEV (Logical Device) 273.

The VDEV 272 is grouped from a predetermined number of PDEVs 271, such as a set of 4 (3D+1P: 3 data drives and 1 parity drive) and a set of 8 (7D+1P: 7 data drives and 1 parity drive). Memory areas provided by the PDEVs 271 belonging to a group aggregate to form one RAID memory area. This RAID memory area becomes the VDEV 272.

Here, not all VDEVs 272 are directly provided on the PDEVs 271, but some VDEVs 272 can be created as virtual intermediate devices. Such virtual VDEVs 272 are trays on which to map LUs (Logical Units) that each of the external storage apparatuses (the first storage apparatus 30 and the second storage apparatus 40) have.

On one VDEV 272, one or more LDEVs 273 can be provided. The LDEV 273 is constructed by dividing the VDEV 272 by a fixed length. When the host 10 is an open-system host, the LDEV 273 is mapped to a LU 274, so that the host 10 recognizes the LDEV 273 as one disc volume through the LU 274. The open-system host 10 accesses to a desired LDEV 273 by specifying a LUN (Logical Unit Number) or a logical block address.

The LU 274 is a device which can be recognized as an SCSI logical unit. Each LU 274 is connected to the host 10 via a target port 211A. One or more LDEVs 273 can be associated to each LU 274. By associating more than one LDEVs 273 to one LU 274, the size of a LU can also be logically expanded.

A CMD (Command Device) 275 is a dedicated LU used for sending/receiving a commands and status between a program working on the host 10 and the controllers (CHA 210, DKA 220) on the storage apparatus. A command from the host 10 is written to the CMD 275. A controller on the storage apparatus executes an operation corresponding to the command written to the CMD 275, and then writes its execution result to the CMD 275 as a status. The host 10 reads out and verifies the status written to the CMD 275 to write to the CMD 275 the content of a processing to be then executed. The host 10 can thus provide directions to the storage apparatus via the CMD 275.

To initiator ports (external port) 211B for external connection of the third storage apparatus 20, the first storage apparatus 30 and the second storage apparatus 40 are connected via the communication network CN3. The first storage apparatus 30 comprises a plurality of PDEVs 320 and a LDEV 330 which was set on memory areas provided by the PDEVs 320. Each LDEV 330 is associated with a LU 340. Similarly, the second storage apparatus 40 comprises a plurality of PDEVs 420 and a LDEV 430, and the LDEV 430 is associated with a LU 440.

The LDEV 330 which the first storage apparatus 30 has is mapped to the VDEV 272 ("VDEV 2") of the third storage apparatus 20 via the LU 340. The LDEV 430 which the second storage apparatus 40 has is mapped to the VDEV 272 ("VDEV 3") of the third storage apparatus 20 via the LU 440.

In this manner, by mapping the real volumes (LDEVs) which the first storage apparatus 30 and the second storage apparatus 40 comprise to a predetermined logical layer of the third storage apparatus 20, the third storage apparatus 20 can give the host 10 an appearance as if the apparatus 20 had the externally present logical volumes 330, 430. It is to be noted that the method for bringing the volumes present outside the third storage apparatus 20 into the third storage apparatus 20 is not limited to the aforementioned example.

Figure 6:
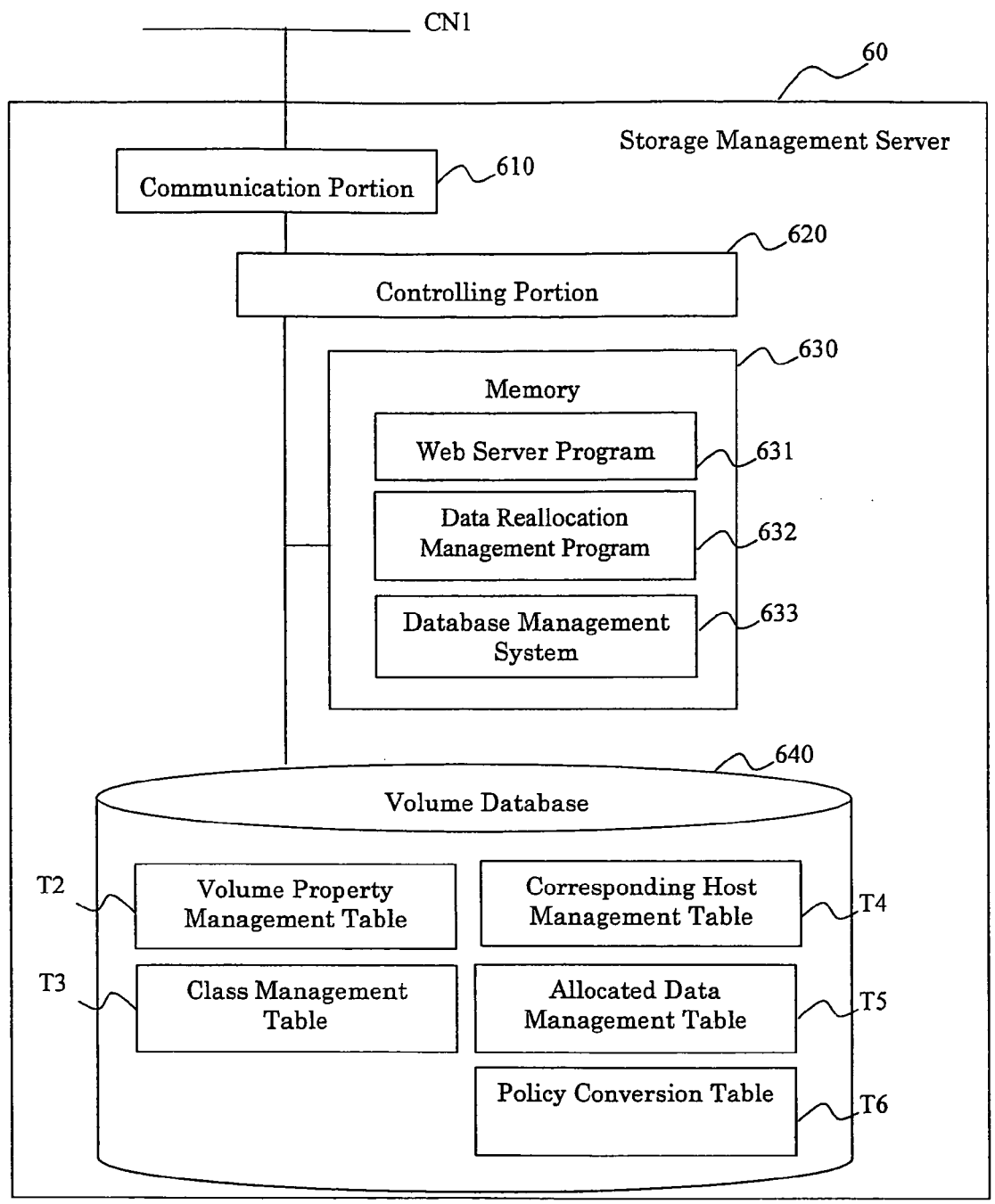
FIG. 6 is a block diagram showing a configuration of a storage management server.

FIG. 6 is a block diagram showing a configuration of the storage management server. The storage management server 60 comprises, for example, a communication portion 610, a control portion 620, a memory 630, and a volume database 640.

The communication portion 610 performs data communication via the communication network CN1. The control portion 620 provides a total control of the storage management server 60. In the memory 630 are stored, for example, a web server program 631, a data reallocation management program 632, and a database management system 633.

The web server program 631 is read into and executed by the control portion 620 to achieve a Web server function on the storage management server 60. The data reallocation management program 632 is read into and executed by the control portion 620 to achieve a data reallocation management function on the storage management server 60. The database management system 633 is read into and executed by the control portion 620 to achieve, on the storage management server 60, a database management function for managing the volume database 640. The Web server, data reallocation management, and database management functions can be performed in a parallel manner.

In the volume database 640 are memorized, for example, a volume property management table T2, a class management table T3, a corresponding host management table T4, an allocated data management table T5, and a policy conversion table T6. An exemplary construction of each of the tables T2-T6 will be described below.

Table Constructions and Overviews

Figure 7:
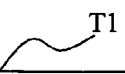
FIG. 7 is a drawing showing a construction of a mapping table.

FIG. 7 is a drawing showing a construction of a mapping table. The mapping table T1 is used to map volumes that the first storage apparatus 30 and the second storage apparatus 40 respectively comprise to the third storage apparatus 20 (see FIG. 4). The mapping table T1 can be memorized in the shared memory 240 of the third storage apparatus 20.

The mapping table T1 is constructed by associating, for example: LUN (LUN#); LDEV No. (LDEV#) and the maximum number of slots of LDEV (MAX. number of SLOT=capacity); VDEV No. (VDEV#), the maximum number of slots of VDEV (MAX. number of SLOTs=capacity), device type, and path information. The path information can be broadly divided into internal path information indicating a path to a memory area (PDEV271) inside the third storage apparatus 20, and external path information indicating a path to a volume which the first storage apparatus 30 or the second storage apparatus 40 has. Into the external path information can be included, for instance, WWN (World Wide Name) and LUN.

FIG. 8 is a drawing showing a construction of a volume property management table. The volume property management table T2 is for managing property information of volumes distributed in the storage management system 1. The table T2 is constructed by associating, for each virtual volume, logical ID specifying the virtual volume, physical ID for a real volume corresponding to the virtual volume, RAID level, emulation type, disc classification, memory capacity, usage state, and type of storage apparatus, for example.

Here, the logical ID is an ID of a logical volume provided to the host 10 by the volume virtualization apparatus 20. The physical ID is an ID to indicate where the real volume corresponding to each logical volume is present. The physical ID is constructed by apparatus No. (apparatus #) of a storage apparatus in which the real volume is stored, and a volume No. (volume #) in the storage apparatus.

The RAID level is information to indicate RAID construction such as RAID 0, RAID 1, and RAID 5. The emulation type is one to indicate a volume type to be shown to the host. For instance, a volume to be provided to an open-system host and that to be provided to a mainframe system host are different in emulation type. The usage state indicates whether or not the volume is in use. The apparatus type indicates the type of storage apparatus in which the volume is present.

Figure 9:
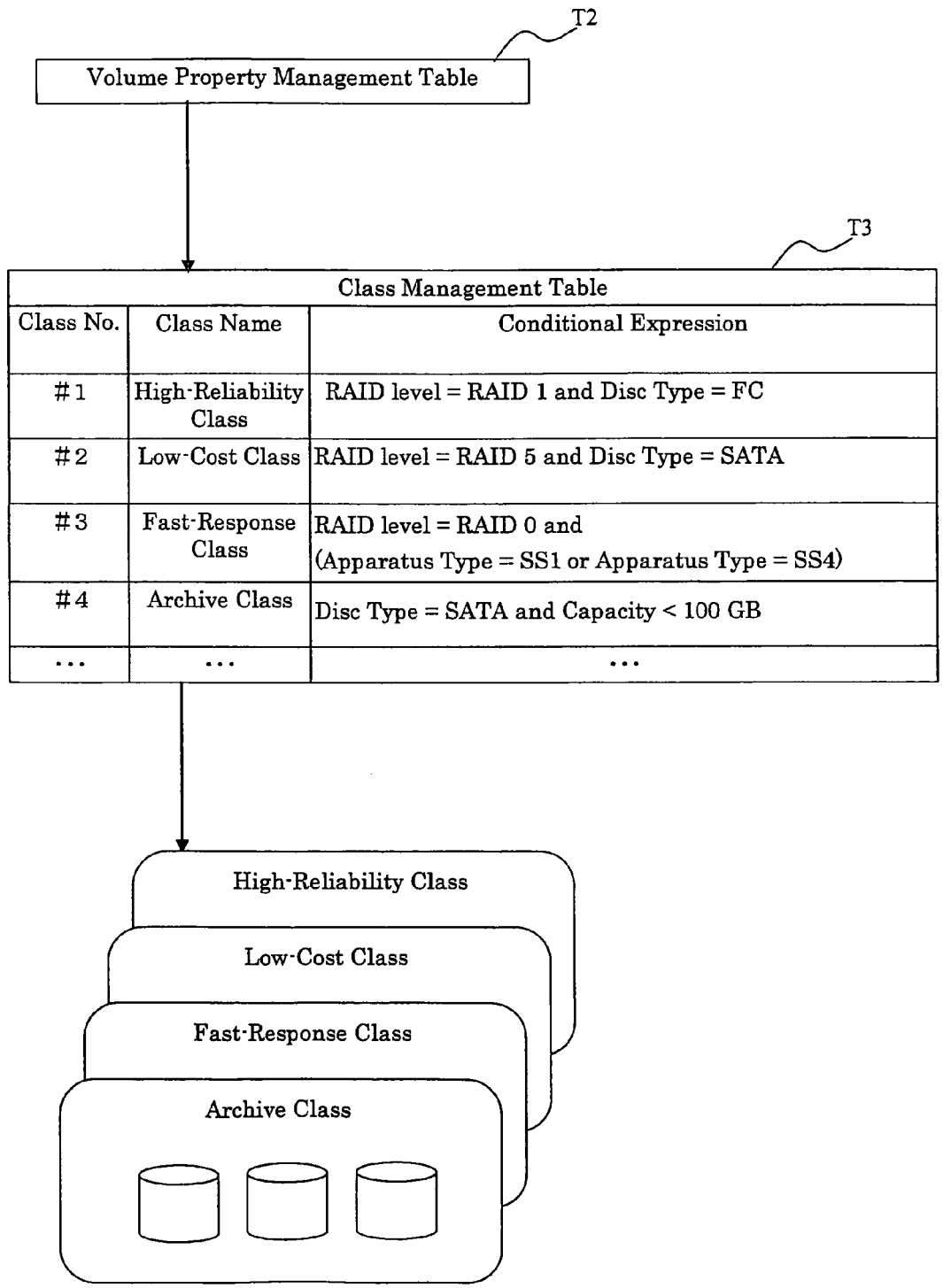
FIG. 9 is a drawing showing a construction of a class management table.

FIG. 9 is a drawing showing a construction of a class management table. The class management table T3 is constructed by associating, for example, class No., class name, and conditional expression for defining the class.

The class name can have a desired name set by the user (such as a system manager). A name such as high-reliability class, low-cost class, fast response class, and archive class may be used as the class name. To the conditional expression is set a retrieval condition for extracting a volume which should belong to the class. The retrieval condition is set by the user as a policy (classification policy) of the class.

Depending on the retrieval condition, it is possible to detect a volume where a given type of disc is constructed at a given RAID level (e.g., "RAID level=RAID 1 and Disc Type=FC"), or to detect a volume present in a given storage apparatus (e.g., "apparatus type=SS1"). For instance, in the high-reliability class (#1), a volume is selected which was made redundant at RAID 1 with a high-reliability FC disc. This allows the high-reliability class to be constructed with a high-reliability volume. In the low-cost class (#2), a volume is selected which was made redundant at RAID 5 with a low-cost SATA disc. This allows the low-cost class to be constructed with a low-cost volume having a comparatively small capacity.

In the fast response class (#3), a (RAID 0-constructed) volume is selected where an existing disc was striped into a type of disc enabling a fast response. This allows the fast response class to be constructed from a volume with fast I/O processing and not requiring a processing such as parity computation. In the archive class (#4), a volume is selected which is constructed from a low cost SATA disc and has less than a given amount of capacity. This allows the archive class to be constructed from a low cost volume.

As shown in FIG. 9, a group of volumes which should belong to each class is selected by retrieving the volume property management table T2 based on a conditional expression (policy regarding to each class) which is set in the class management table T3. It is to be noted here that a class and a group of volumes are not directly associated, but indirectly associated through a conditional expression. This allows a variety of changes in physical construction of the storage management system 1 to be easily dealt with.

When actually reallocating data, the volumes may be classified in advance, at a timing such as after a volume construction is changed, after a policy regarding to each class is specified, before data is reallocated, and on a periodical timing, for instance.

Figure 10:
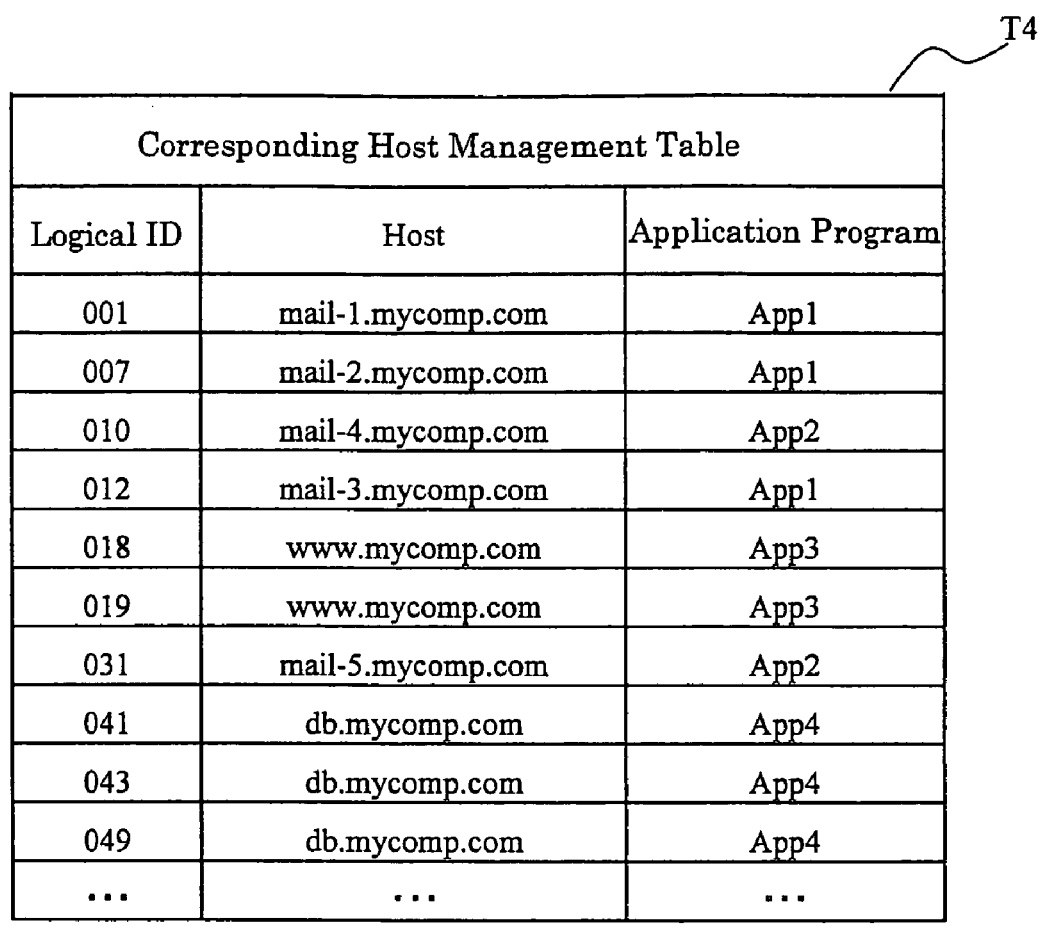
FIG. 10 is a drawing showing a construction of a corresponding host management table.

FIG. 10 is a drawing showing a construction of a corresponding host management table. Corresponding host management table T4 is a table for managing correspondence between a volume and a host. The table T4 is constructed by associating, for example, a logical ID, a host, and an application program. Logical ID is for identifying a virtual volume. Host is information (e.g., a domain name) for specifying a host to access to the virtual volume. Application program is a name of the application program on the host using the virtual volume.

FIG. 11 is drawing showing a construction of an allocated data management table. In this embodiment, interrelated groups of volumes can be set as a unit for data reallocation, assuming a case in which data to be reallocated is divided into one or more interrelated groups of volumes and stored. This allows the data stored in a plurality of interrelated groups of volumes to be reallocated in a lump.

The reallocated data management table T5, which is for managing all data allocated in a class, is constructed by associating, for example, data No., data name, construction volume ID, current class, data capacity, and data allocation policy. Construction volume ID is a logical ID for specifying the volume of the data storage destination. Current class is the name of the class to which the data currently belong. Data capacity is the capacity of the volume in which the data is to be stored. When data is stored in a plurality of volumes, the total capacity of these volumes is the data capacity. Data allocation policy is a policy specified by the user when data was allocated to the current class, and in particular manages a request from the user relevant to data allocation.

Data name can be freely set by the user. Also, each data can be positioned as a volume for storing a data set to be used by a same application program, or grouped volumes that store a data set that construct a same file system.

System Processing

Next, referring to FIGS. 2, 8, 11, and 18 accordingly, processing of the storage management system will be described.

Figure 12:
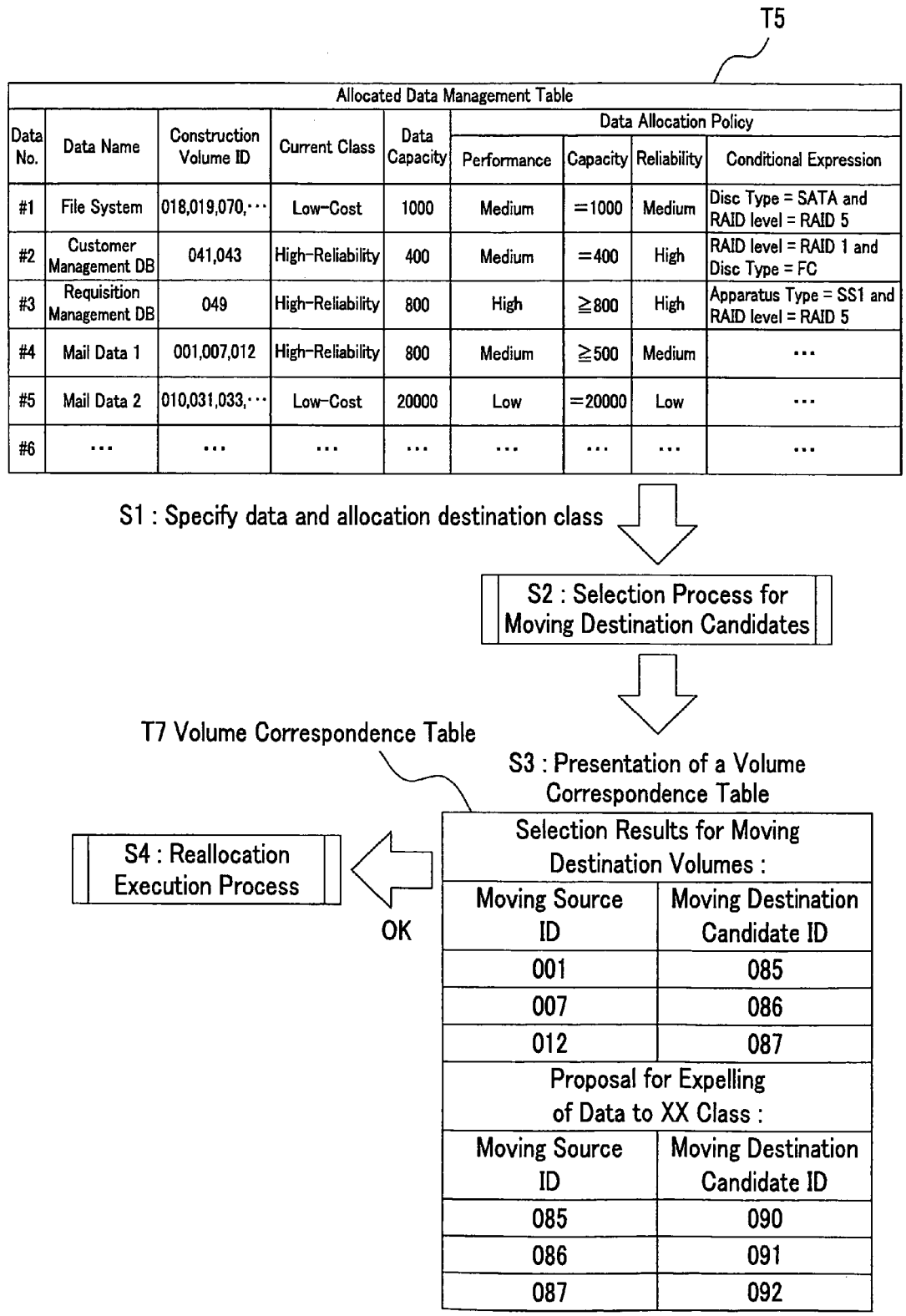
FIG. 12 is drawing showing a general operation of data reallocation.

FIG. 12 is drawing showing in a simplified manner a general operation of data reallocation. Hereinafter, reference will be made to FIG. 2 when necessary. In data reallocation, the user logs into the storage management server 60 via the management client 50 to specify the data to be reallocated and the class of the reallocation destination (S1). For each volume in which the specified data is stored, the storage management server 60 selects a volume of a moving destination candidate (S2). In the process of selecting the volume of the moving destination candidate, one volume to which can be copied the data in the volume of the moving source is selected, out of all volumes that belong to a class specified as a moving destination. Further details will be described below.

The result of the selection of the volume of the moving destination candidate by the storage management server 60 is presented to the user in a form of the volume correspondence table T7 (S3), for instance. This example shows a volume correspondence table for a case in which it is required to expel data to another class for reallocation. The volume correspondence table T7 is constructed, for example, by associating logical ID (moving source ID) and logical ID of a volume of a moving destination candidate (moving destination candidate ID). The user checks, on the Web browser 51, a reallocation proposal (volume correspondence table T7) presented by the storage management server 60. If the user accepts (OKs) the proposal from the server 60 as is, then the reallocation will be performed at a predetermined timing (S4). Although the timing may include, for instance, when the user accepts the proposal and when the working rate of the storage apparatus declines, the user may specify the time zone to perform reallocation.

Figure 13:
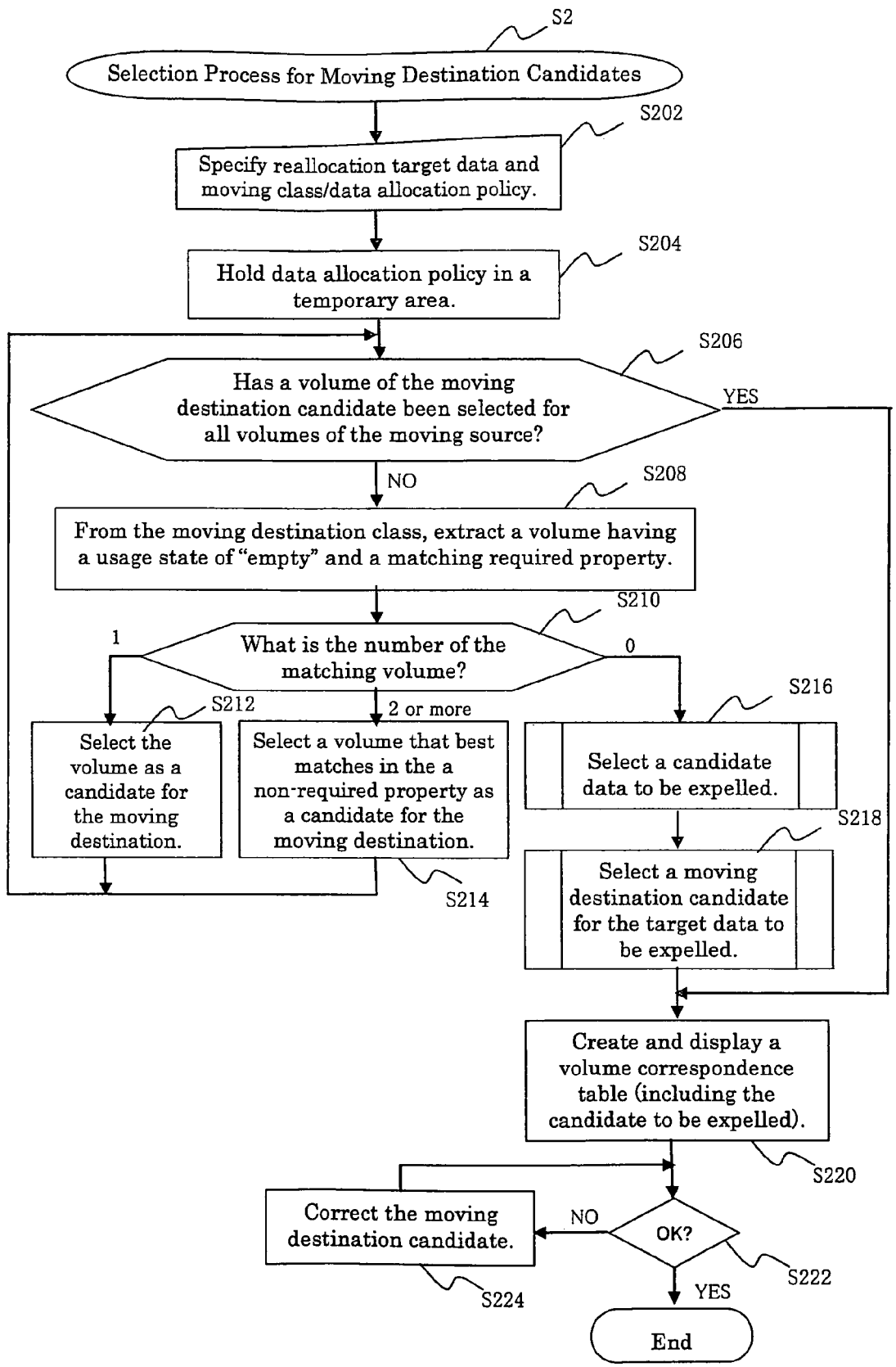
FIG. 13 is a flowchart showing a process of selecting a moving destination candidate.

FIG. 13 is a flowchart showing a process of selecting a volume of a moving destination candidate, and is a detailed illustration of the process of selecting a moving destination candidate (S2) of FIG. 12. This process is initiated (S202), for example, by the user implicitly specifying the data to be reallocated and a class of reallocation destination (moving destination). Here, instead of specifying a class of reallocation destination, a policy related to the moving destination (data allocation policy) may be specified (S202). In this case, the storage management server 60 (data reallocation program 632) retrieves a class that best meets the specified data allocation policy, and specifies the class as the moving destination class. The data allocation policy which was input is held in a temporary area (S204). If the data allocation policy is not specified, then S204 is skipped.

The storage management server 60 (data reallocation program 632) judges whether or not the volume of the moving destination candidate has been selected with respect to all moving source volumes (S206). Here, step 206 is judged as "NO" and proceeds to S208. Then the storage management server 60 extracts (S208) a volume having a usage state of "empty" and required properties matching with those of the moving source volume, from a group of volumes that belong to a class specified as the moving destination, by referring to the volume property management table T2 (FIG. 8). Volumes may be classified in advance in the volume property management table T2 or other tables. The volume extraction at S208 may be performed at the time point when the moving destination class was determined.

Next, the storage management server 60 judges the number of volumes detected as empty volumes having matching required properties (S210). If one empty volume is detected as having matching required properties ("1" of S210), then this volume is selected as the volume of the moving destination candidate (S212).

If a plurality of empty volumes are detected as having matching required properties ("2 or more" of S210), the storage management server 60 selects (S214) as the volume of the moving destination candidate, a volume that best matches with a property other than the required properties (non-required properties). For example, a volume having more matches in other property items such as RAID level, disc type, and type of storage apparatus is selected as the volume of the moving destination candidate. The matching degree may be calculated by weighting each of the non-required property items. When a plurality of volumes are present having an equal matching degree in the non-required properties, a volume with a smaller logical ID may be selected, for instance.

If no empty volume with matching required properties is found ("0" of S210), which means the rest of the moving source volumes (moving source volumes with no selected volume of the moving destination candidate) can not be moved under this condition, then in order to create an empty space in the volume in the class specified as the moving destination, candidate data to be expelled is selected from the data allocated in the class (S216). For this, by searching out data having a data allocation policy conforming to a policy of other class out of the data allocated in the class specified as the moving destination, target data to be expelled and a class of expelling destination of the data are determined, so that the volume of the storage destination for the target data to be expelling can be selected as a moving destination candidate. Then, a volume of the moving destination candidate is selected for the target data to be expelled (S218). Further details will be described below.

The processes of S208 to S214 are each performed for all volumes provided as the storage destinations for the reallocation target data. If, for each of all the moving source volumes, a corresponding volume in the moving destination candidate is selected (S206: YES), the storage management server 60 creates the volume correspondence table T7 (see FIG. 12) and displays it to the user (S220). In this table T7, the volumes of moving destination candidates are presented for all the volumes specified as storage destinations for the reallocation target data and the target data to be expelled. This is presented in the volume correspondence table (S3) of FIG. 12.

The user checks the volume correspondence table T7 presented from the storage management server 60 to decide whether to accept or correct the table. If the user accepts (OKs) it (S222: YES), then this process ends. If the user desires to modify (does not OK) the table (S222: NO), then he/she corrects the volumes of the moving destination candidate by using the web browser (S224). When the user is done with the correction, this process ends.

Figure 14:
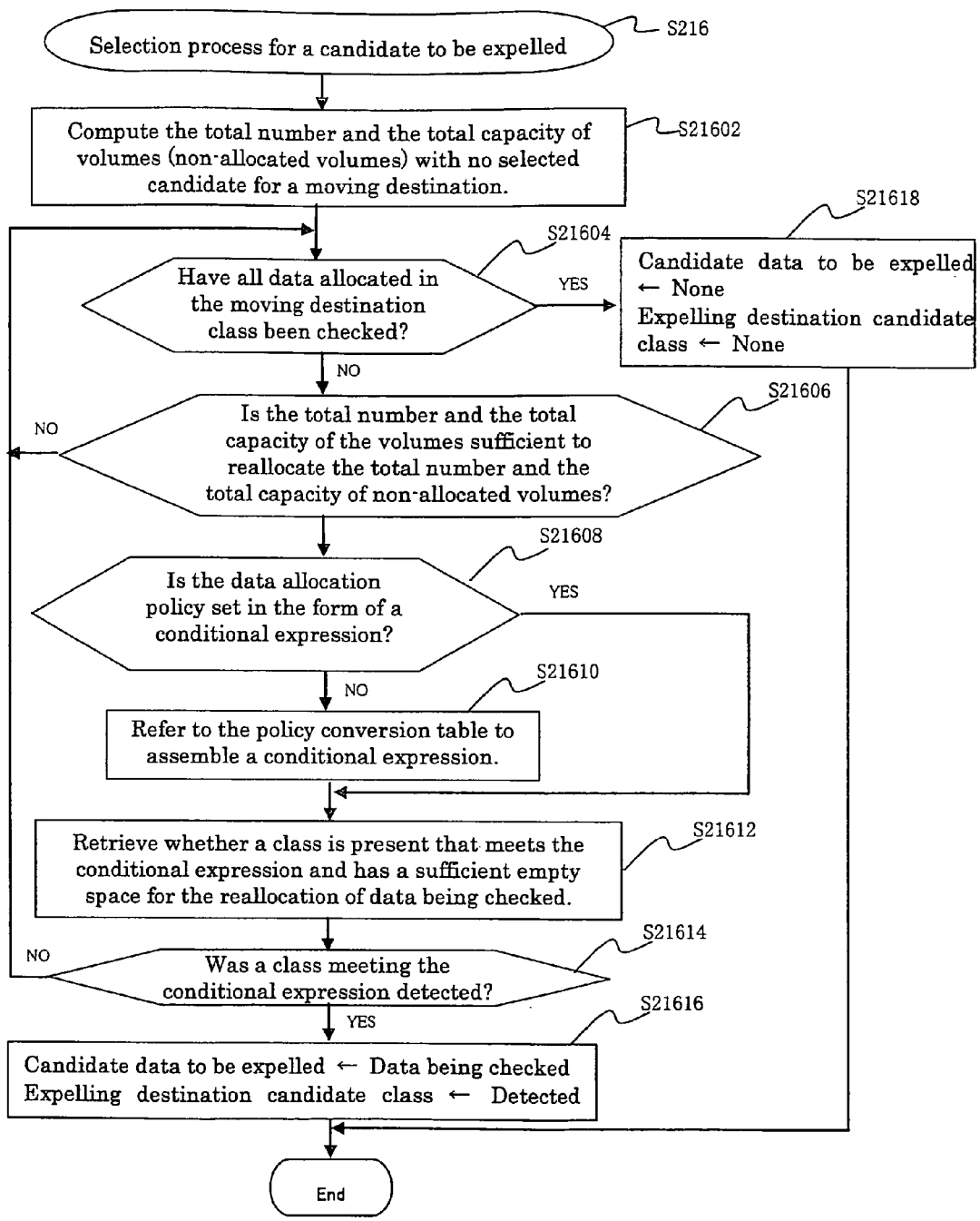
FIG. 14 is a flowchart showing a process of selecting candidate data to be expelled.

FIG. 14 is a flowchart showing a process (S216) of selecting candidate data to be expelled, and is a detailed illustration of the process of selecting a candidate to be expelled of FIG. 13. This process is conducted when no empty volume with matching required properties is found in the specified moving destination class, in the process of FIG. 13 of selecting a volume of the moving destination candidate. Here, description will be made considering the data consists of one or more volumes.

The storage management server 60 (data reallocation management program 632) computes (S21602), of the volumes belonging to the reallocation target data, the total number of the volumes with no selected (determined) moving destination candidate (the number of non-allocated volumes) and the total capacity of the volumes (the total non-allocated capacity). Then the server 60 judges whether all data allocated to the reallocation destination class have been completely checked (S21604). The process is first judged as "NO" and proceeds to step S21606.

First, in order to judge if data allocated to the reallocation destination class can be a target to be expelled, it is checked whether or not the number of volumes and the total capacity of the data are sufficient to reallocate the non-allocated volumes and the total non-allocated capacity, respectively (S21606). If the number of volumes and the total capacity are sufficient (S21606: YES), this step proceeds to S21608. If not (S21606: NO), then it returns to S21604 to check the next data.

Next, it is judged whether or not a data allocation policy related to the data being checked is set in the form of a conditional expression (S21608). If not (S21608: NO), a conditional expression is assembled (S21610) by referring to the policy conversion table (FIG. 18). For example, if reliability is specified to "High" from a moving destination policy input screen 6322, an expression of "disc type=FC and RAID level=RAID 1" is assembled from the policy conversion table T62 of FIG. 18(b). If so (S21608: YES), or if the assembly of the expression (S21610) is complete, then the storage management server 60 retrieves whether or not a class is present which meets the expression and has a sufficient empty space to reallocate the data being checked (S21612). If a class meeting the condition is detected (S21614: YES), then the data being checked is made the candidate data to be expelled, the class detected in S21612 is determined as the class of the candidate expelling destination (S21616), and the process ends. If the class is not detected (S21614: NO), the step returns to S21604 to check the next data. If no class meeting the condition is detected even after all data have been checked (S21604: YES), a setting is made to indicate it is impossible to expel data (S21618), and the process ends.

Figure 15:
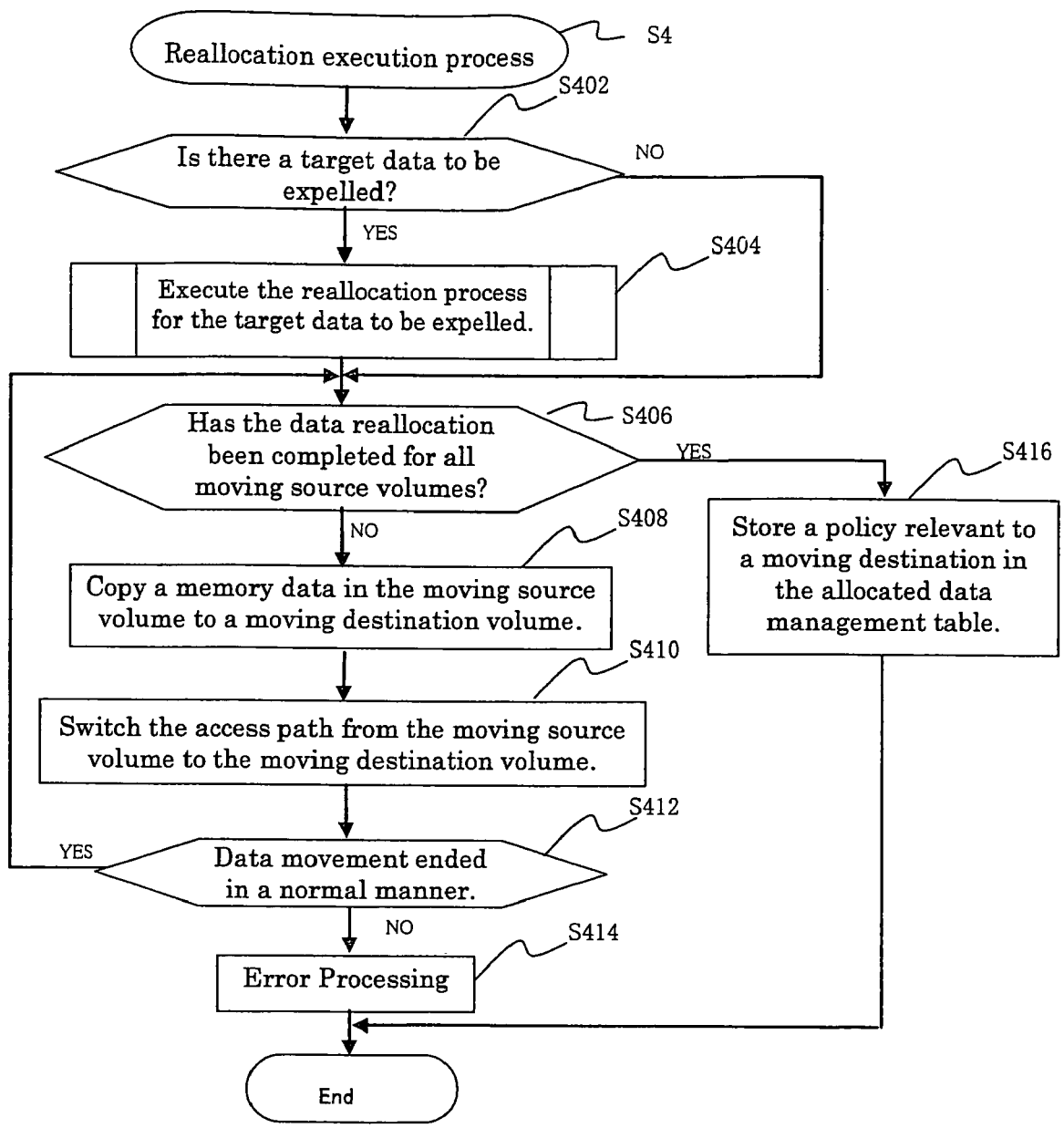
FIG. 15 is a flowchart showing a reallocation execution process.

FIG. 15 is a flowchart showing a reallocation execution process, and is a detailed illustration of the reallocation execution process (S4) of FIG. 12. The storage management server 60 (the data reallocation management program 632) judges (S402) whether or not expelling of data occurs in reallocating the target data (whether or not there is target data to be expelled). If so (S402: YES), reallocation execution process relevant to the reallocation target data to be expelled is performed (S404), and the step proceeds to S406. Then the server 60 judges whether or not reallocation is completed for all moving source volumes constituting the reallocation target data (S406). In this step, the process is first judged as "NO" and proceeds to S408. Then, data stored in the moving source volume is copied to a moving destination volume corresponding to the moving source volume (S408), and the access path is switched from the moving source volume to the moving destination volume (S410). This allows the host 10 to access to a desired data using a setting as is, without being aware of the data reallocation.

The storage management server 60 judges whether or not the moving of data from the moving source volume to the moving destination volume was completed in a normal manner (S412). If not (S412: NO), then an error processing (S414) is performed to end this reallocation execution process. If so (S412: YES), then the process returns to S406.

In this manner, data stored in each of all the volumes belonging to the reallocation target data and the target data to be expelled, are copied to the moving destination volume to which the access path is switched. Then, if data reallocation is completed for all the moving source volumes (S406: YES), then a policy relevant to the moving destination which was specified when reallocation was directed (a policy of the moving destination class or a data allocation policy) is stored (S416) in the allocated data management table T5 (see FIG. 11), and this process ends.

FIG. 16 is a drawing showing an exemplary volume correspondence table (an exemplary display on which a data reallocation schedule is presented). The result of selections made by the storage management server 60 for the volumes of the moving destination candidate is displayed, for example, on the Web browser 51 of the management client 50, by locating the moving source volumes (Source) and the volumes of the moving destination candidate (Target) in two upper and lower steps, as shown in FIG. 16. For each moving source volumes and each moving destination volume, properties such as its logical ID, number of the RAID group to which the volume belongs, RAID level, emulation type, and memory capacity can be displayed in combination. Also, when the moving of data to the volume of the moving destination candidate is accompanied by expelling the allocated data, this also should be displayed. For example, whether or not the expelling of data occurs may be indicated with a mark such as "*" (an asterisk). Also, the volumes of moving destinations of the volumes to be expelled may be displayed in a similar manner.

The user can judge whether or not to execute data reallocation, by checking the display of FIG. 16.

FIG. 17 shows a moving destination policy input screen for specifying a policy relevant to the moving destination (data allocation policy) instead of specifying a moving destination class. A moving destination policy input screen 6320 shown in FIG. 17 (a) is an exemplary screen of the type individually specifying the volume properties such as Capacity, Emulation Type, RAID Level, and Disk Type. A moving destination policy input screen 6322 shown in FIG. 17 (b) is an exemplary screen of the type specifying requests from an end-user's point of view such as Capacity, OS type, level of reliability or performance, directed for such users who, for example, does not have enough knowledge on hardware, or desires to specify the moving destination without being much aware of individual volume property. Data which was input to the data parameters of the moving destination policy input screen 6322 is converted to a volume property by using a policy conversion table such as that shown in FIG. 18.

FIG. 18 is a drawing showing an exemplary construction of a policy conversion table. FIG. 18 (a) shows a construction of an OS-type-related policy conversion table T61, for associating a request on the OS type which was input on the input screen 6322 with an emulation type. With each OS type, an emulation type (EMU1, EMU2) is associated. FIG. 18 (b) shows a construction of a reliability-related policy conversion table T62, for associating a request on reliability which was input on the input screen 6322 with a disc type and RAID level. With each level of reliability of "High", "Medium", and "Low", a disc type (FC, SATA) and RAID level (RAID 1, RAID 2) are associated. FIG. 18 (c) shows a construction of a performance-related policy conversion table T63, for associating a request on performance which was input on the input screen 6322 with a storage apparatus type. With each level of performance of "High", "Medium", and "Low", a storage apparatus type (SS1-SS8) is associated.

An embodiment of the present invention has been described above in which a storage management system according to the embodiment of the present invention is achieved by recording a program executed on each of the hard wares shown in FIG. 2 (including the data reallocation control program) to a computer-readable recording medium. These programs may be provided to a computer system via a network such as the internet.

While a preferred embodiment of the invention has been described above, the invention is not limited to the embodiment described above but may be modified as needed within the scope of the spirit of the invention.

What is claimed is:

1. A storage management system comprising:
   a plurality of storage apparatuses each comprising one or more volumes for storing data;
   a volume virtualization apparatus for virtually and unitarily managing volumes which the plurality of storage apparatuses comprise; and a storage management server for managing data reallocation between or among volumes in one of the storage apparatuses, or between or among volumes in the plurality of storage apparatuses, which are connected in the system, wherein the storage management server comprises:

a storing portion for including and storing volume property information for managing a volume property indicating a property of each of the volumes, a classification policy which is a condition for classifying the volume in regard to the volume property, and a data allocation policy for managing a request from a user relevant to data allocation; and a control portion for classifying the volumes based on the volume property information and the classification policy in advance, and for reallocating data in a moving source volume specified by the user to a volume meeting a class specified by the user or a class meeting the data allocation policy, and expelling data present in a reallocation destination as needed.

2. The storage management system as claimed in claim 1, wherein the storing portion stores a policy conversion table for converting a data allocation policy into the volume property when the data allocation policy is a request from an operational point of view, and the control portion converts the data allocation policy to the volume property in accordance with the policy conversion table, to specify the class from the converted volume property.

3. A storage management system comprising:
a storage apparatus comprising one or more volumes for storing data; and
a storage management server for managing data reallocation between or among volumes in the storage apparatus, which are connected in the system, wherein the storage management server comprises:
a storing portion for including and storing volume property information for managing a volume property indicating a property of each of the volumes, a classification policy which is a condition for classifying the volumes in regard to the volume property, and a data allocation policy for managing a request from a user relevant to data allocation; and
a control portion for classifying the volumes based on the volume property information and the classification policy in advance, and for reallocating data in a moving source volume specified by the user to a volume meeting a class specified by the user or a class meeting the data allocation policy, and expelling data present in a reallocation destination as needed.

4. The storage management system as claimed in claim 3, wherein the storing portion stores a policy conversion table for converting a data allocation policy into the volume property when the data allocation policy is a request from an operational point of view, and the control portion converts the data allocation policy to the volume property in accordance with the policy conversion table, to specify the class from the converted volume property.

5. A storage management server connected to a plurality of storage apparatuses each comprising one or more volumes for storing data, the server managing reallocation of data between or among volumes in one of the storage apparatuses, or between or among volumes in the storage apparatuses, wherein the server comprises:
a storing portion for including and storing volume property information for managing a volume property indicating a property of each of the volumes, a classification policy which is a condition for classifying the volumes in regard to the volume property, and a data allocation policy for managing a request from a user relevant to data allocation; and
a control portion for classifying the volumes based on the volume property information and the classification policy in advance, and for reallocating data in a moving source volume specified by the user to a volume meeting a class specified by the user or a class meeting the data allocation policy, and expelling data present in a reallocation destination as needed.

6. A storage management server connected to a storage apparatus comprising one or more volumes for storing data, the server managing reallocation of data between or among volumes in the storage apparatus, wherein the server comprises:
a storing portion for including and storing volume property information for managing a volume property indicating a property of each of the volumes, a classification policy which is a condition for classifying the volumes in regard to the volume property, and a data allocation policy for managing a request from a user relevant to data allocation; and
a control portion for classifying the volumes based on the volume property information and the classification policy in advance, and for reallocating data in a moving source volume specified by the user to a volume meeting a class specified by the user or a class meeting the data allocation policy, and expelling data present in a reallocation destination as needed.

7. A method for controlling data reallocation in which a storage management server controls data reallocation between or among volumes of different classes, in a storage management system which virtually and unitarily manages a plurality of storage apparatuses each comprising one or more volumes for storing data, and classifies and manages the volumes according to a classification policy defined by the user, wherein the storage management server includes and executes:
receiving a reallocation request that includes specifying moving target data and specifying a moving destination class or data allocation policy;
setting a class that meets the data allocation policy as a moving destination class when the data allocation policy was specified;
selecting a volume of a moving destination candidate from unused volumes which belong to the moving destination class;
selecting as candidate data to be expelled, data conforming to a classification policy of a class other than the moving destination class, out of data stored in a volume in use which belongs to the moving destination class, in case no unused volume could be found which can be a volume of moving destination candidate;
reallocating the candidate data to be expelled and the moving target data; and
holding a classification policy of the moving destination class or the data allocation policy, in relation to the reallocated moving target data.

8. A method for controlling data reallocation in which a storage management server controls data reallocation between or among volumes of different classes, in a storage management system which manages a storage apparatus comprising one or more volumes for storing data, and classifies and manages the volumes according to a classification policy defined by the user, wherein the storage management server includes and executes:

receiving a reallocation request that includes specifying moving target data and specifying a moving destination class or data allocation policy;

setting a class that meets the data allocation policy as a moving destination class when the data allocation policy was specified;

selecting a volume of a moving destination candidate from unused volumes which belong to the moving destination class;

selecting as candidate data to be expelled, data conforming to a classification policy of a class other than the moving destination class, out of data stored in a volume in use which belongs to the moving destination class, in case no unused volume could be found which can be a volume of moving destination candidate;

reallocating the candidate data to be expelled and the moving target data; and holding a classification policy of the moving destination class or the data allocation policy, in relation to the reallocated moving target data.

9. A computer-readable storage medium including a data reallocation control program wherein the program makes a computer execute the method for controlling data reallocation as claimed in claim 7.

10. A computer-readable storage medium including a data reallocation control program wherein the program makes a computer execute the method for controlling data reallocation as claimed in claim 8.

* * * * *